United States Patent
Lin

(10) Patent No.: US 9,326,633 B2
(45) Date of Patent: May 3, 2016

(54) STEAMER

(71) Applicant: Uni-Splendor Corp., Tainan (TW)

(72) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 355 days.

(21) Appl. No.: 13/974,098

(22) Filed: Aug. 23, 2013

(65) Prior Publication Data

US 2015/0053095 A1 Feb. 26, 2015

(51) Int. Cl.
*A47J 27/00* (2006.01)
*A47J 27/05* (2006.01)
*A47J 27/04* (2006.01)

(52) U.S. Cl.
CPC ............ *A47J 27/05* (2013.01); *A47J 2027/043* (2013.01)

(58) Field of Classification Search
CPC ..... A47J 27/05; A47J 27/04; A47J 2027/043; A47J 36/20; A47J 27/16
USPC ........... 99/417, 416, 413, 410, 415, 418, 449, 99/448; 126/369.3
See application file for complete search history.

(56) References Cited

U.S. PATENT DOCUMENTS

| 252,884 | A | * | 1/1882 | Linney | 126/369.3 |
| 492,195 | A | * | 2/1893 | Doty | 126/369.3 |
| 3,641,926 | A | * | 2/1972 | Williams et al. | 99/448 |
| 4,702,160 | A | * | 10/1987 | Manganese | 99/417 |
| 5,097,753 | A | * | 3/1992 | Naft | 99/341 |
| 8,522,674 | B2 | * | 9/2013 | Lee | 99/416 |

FOREIGN PATENT DOCUMENTS

DE 683228 * 11/1939 ............. 126/369.3

* cited by examiner

*Primary Examiner* — Reginald L Alexander

(74) *Attorney, Agent, or Firm* — Alan D. Kamrath; Kamrath IP Lawfirm, P.A.

(57) ABSTRACT

An improved steamer for heating food includes a base with a heating unit and a controlling switch, a plurality of pot units, a plurality of racks, and a lid. The pot units seat on top of the base, and the racks are placed on a bottom of each pot unit. Several steam ducts are arranged on ends of the pot units, and an opening is defined in the steam ducts. A cover is put on the opening. The lid is placed onto the upper pot unit. When the steamer with food is heated, the steam from the heating unit is introduced into the pot units from the openings of the steam ducts to heat the food. Each pot unit is isolated, and the steam introduced will not mix, and odors from the pot units will not interfere with other pot units.

16 Claims, 13 Drawing Sheets

STEAMER

BACKGROUND OF THE INVENTION

1. Technical Field

The prevent invention provides an improvement to a steamer and, more particularly, to an improved steamer in which each of stacked pot units is supplied with steam via an individual steam duct to homogeneously and individually heat up food in the individual pot unit, thereby preventing the steam from becoming extensively built-up merely in the lowest level and properly and individually directing the steam to each level of the pot unit to heat up the food to the intended temperature. In addition, mixing of odors from different food in different pot units can be also prevented.

2. Description of Prior Art

Conventionally, there are a variety of steamers in shape as well as configuration. Typically, three or four levels of pot units made from aluminum material are stacked together to configure the steamer. In general, the bottom of each pot unit is defined with a plurality of ventilation holes, and a vessel or container is located at the lowest level on which those pot units are seated. Once the water contained in the vessel is heated to boil, the steam generated therefrom will vent through each of the pot units through those ventilation holes from bottom to top levels. Accordingly, food placed in each level is therefore heated by the steam vented therethrough.

The conventional steamer can reach its intended purposes of heating up the food, and it is apparent that the route the steam vents through is from the lowest level, i.e. the vessel, to the highest level gradually, venting through the ventilation holes one level after the other level. It can be readily noticed that the food in the lowest level can be readily heated as they are in contact with the steam firstly. However, the food placed in the lowest level can be easily overheated or socked by the steam, rendering a poor appearance or setting of the food. Furthermore, the food placed in different levels will also mix up, because each of the pot unit is in communication with each other through the ventilation holes.

In light of this, the present invention provides a measurement to overcome the problems encountered by the existing steamer. It is intended to direct the steam into the pot unit individually at each level to homogeneously heat up the food placed thereof to effectively prevent a steam built-up at the lowest level. Accordingly, the food placed in each level is heated by the steam introduced therein periodically, to have the food heated to its intended temperature. In addition, since the pot units are isolated from each other, mixing of the odors from different food can be effectively avoided.

BRIEF SUMMARY OF THE INVENTION

The present invention provides an improvement to overcome the problems encountered by the existing steamer. It is intended to direct the steam into each of the stacked pot units individually at each level to homogeneously heat the food placed thereof to effectively prevent a steam built-up merely at the lowest level. Accordingly, the food placed in each level is heated by the steam introduced therein periodically, to have the food heated to its intended temperature. In addition, since the pot units are isolated from each other, mixing of the odors from different food can be effectively avoided.

It is a primary objective of the present invention to provide an improved steamer which is configured with a base built-up with a heating unit and a controlling switch, a plurality of pot units, a plurality of racks, and a lid. The pot unit can be readily seated on top of the base, and the racks can be readily placed on a bottom of the pot unit. At least one or more than one steam ducts are arranged on longitudinal ends of the pot unit. At least one opening is defined in the steam ducts at each end, and a cover is associated with each opening. The steam from the base can be readily introduced into each pot unit through the openings. The lid is placed onto the upper pot unit. Once the steamer is filled with food to be heated, the heating unit within the base can be turned on, and the steam can be introduced individually into each of the pot units from the opposite openings of the steam ducts to evenly heat the food placed in each of the pot unit. Since each of the pot units is isolated from each other, and the steam introduced therein is also individual without mixing. Accordingly, odors of food from different pot units will not interfere with the food located at other pot units.

According to a second purpose of the present invention, the base is provided with a recessed shoulder on a top thereof for firmly receiving the pot unit thereon.

According to a third purpose of the present invention, a bottom of the pot unit is provided with a grooved shoulder in which a ring of the rack can be disposed therein. The groove shoulder can be used to collect condensed water from the steam.

According to a fourth purpose of the present invention, the rack disposed on the bottom of the pot unit includes a plurality of ribs across a surface thereof, and a handle is formed on the top of the rack.

According to a fifth purpose of the present invention, each pot unit is provided with tabs on opposite sides thereof for readily seating onto another pot unit and for convenient handling by the user.

According to a sixth purpose of the present invention, the lid covered on the upper pot unit is provided with a release valve.

According to a seventh purpose of the present invention, the openings on opposite sides of each of the pot units seated onto the base have been offset from each other, such that the steam from the base can be introduced diagonally to evenly heat the food placed in the pot unit.

According to an eighth purpose of the present invention, the rack placed within the pot unit can be readily removed and replaced with a hollowed rack, and the ring of the hollowed rack can be readily disposed within the grooved shoulder to accommodate elongated food.

According to a ninth objective of the present invention, an improved steamer, which is configured with an improved steamer for heating a plurality of food with steam, comprises a base built-up with a heating unit and a controlling switch, a plurality of pot units, a plurality of racks, and a lid. The pot unit can be readily seated on a top of the base, and the racks can be readily placed on a bottom of the pot unit. At least one or more than one steam ducts are arranged on a longitudinal side of the pot unit. At least one opening is defined in the steam ducts located at the longitudinal side. The steam from the base can be readily introduced into each pot unit through the opening, and the lid is placed onto the upper pot unit. Once the steamer is filled with food to be heated, the heating unit within the base can be turned on, and the steam can be introduced individually into each of the pot units from the opening of the steam ducts located on the longitudinal side to evenly heat the food placed in each pot unit. Since the pot units are isolated from each other, and since the steam introduced therein is also individual without mixing, odors of food from different pot units will not interfere with the food located at other pot units.

According to a tenth purpose of the present invention, the lid covered on the upper pot unit is provided with a release valve.

DETAILED DESCRIPTION OF THE INVENTION

Figure 1:
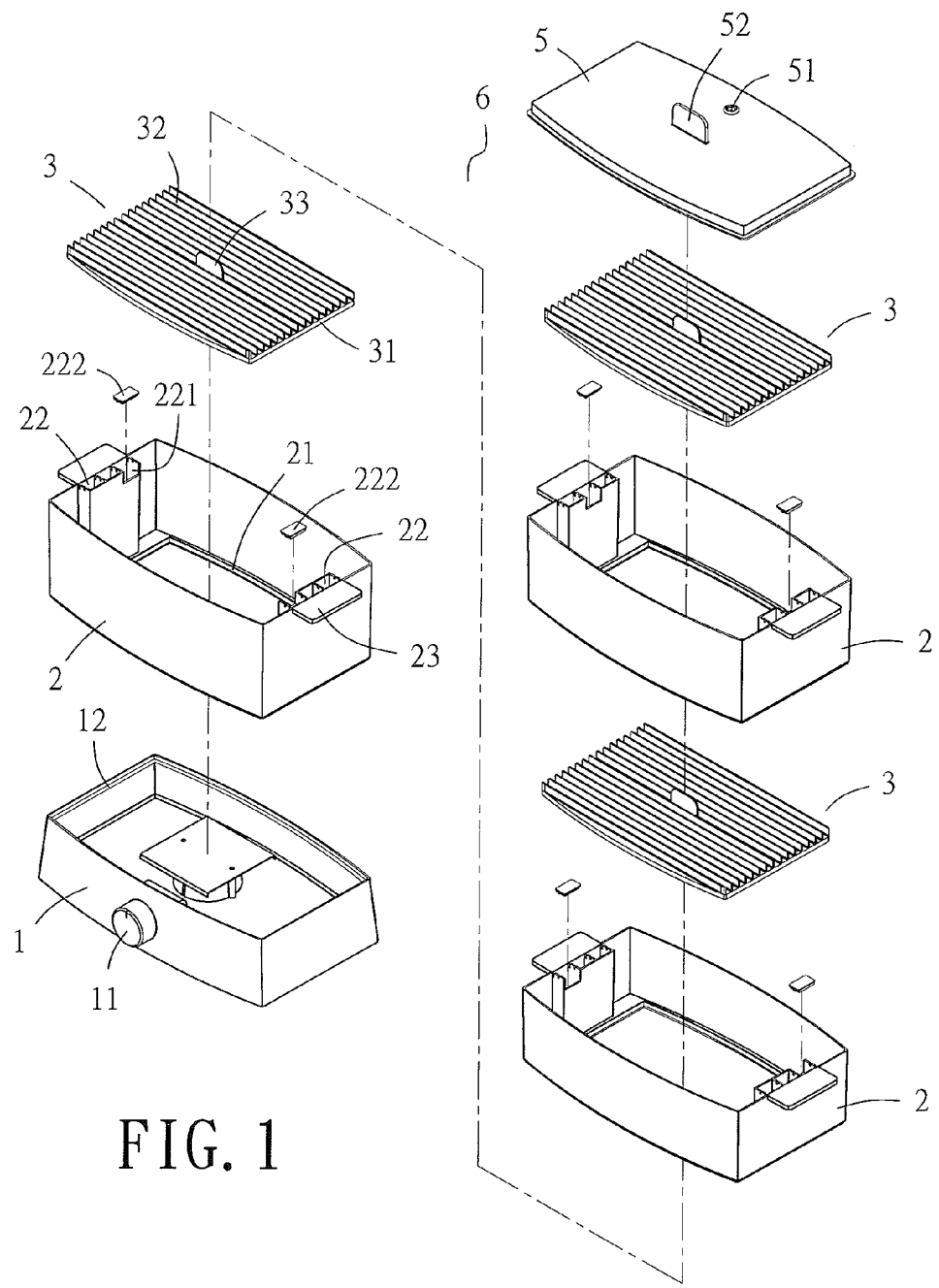
FIG. 1 is an exploded view of a steamer made in accordance with the present invention.

As shown in FIG. 1, an improved steamer 6 made in accordance with the present invention is shown, and includes a base 1 incorporated with a heating unit and a controlling switch, a plurality of pot units 2, a plurality of racks 3, and a lid 5.

Figure 3:
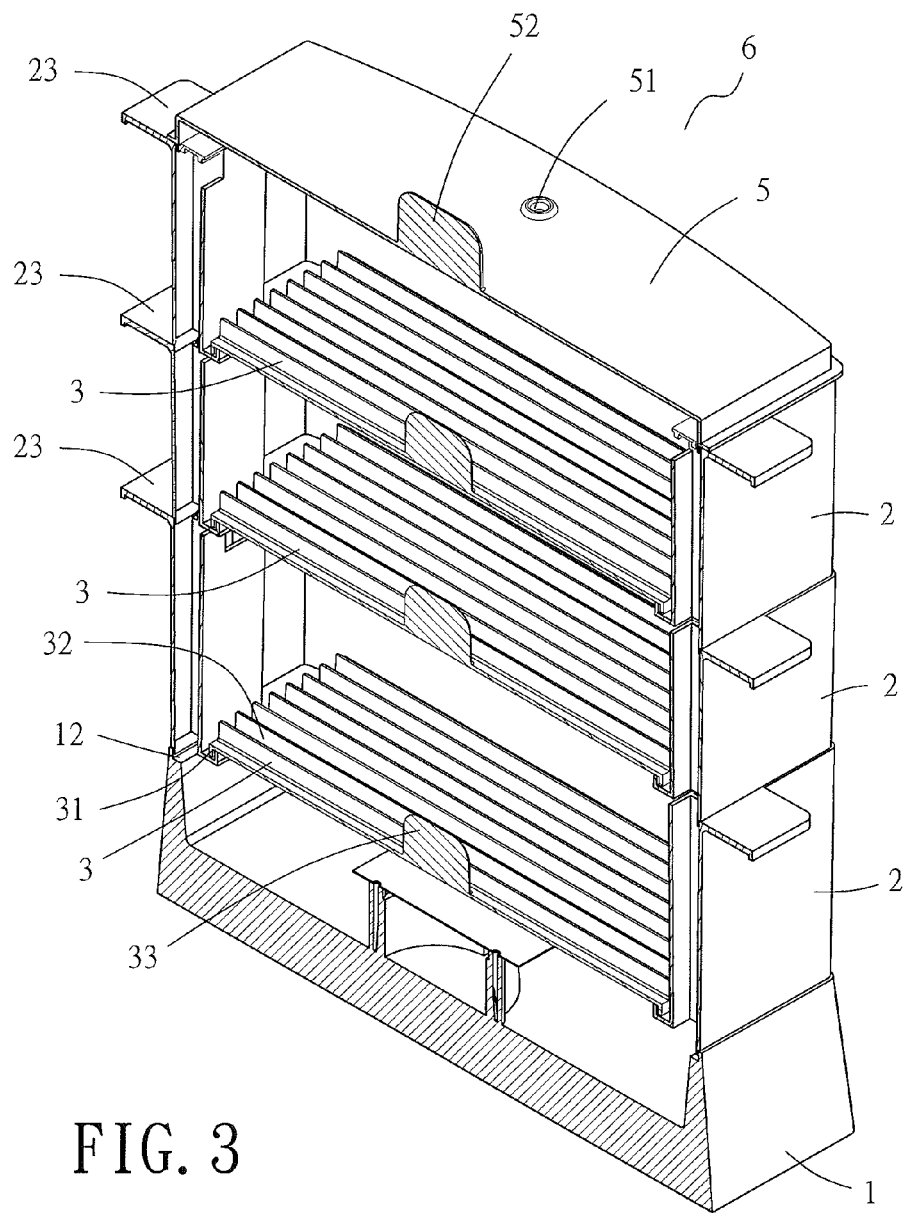
FIG. 3 is a cross sectional view taken along a longitudinal direction thereof.

The base 1, incorporated with a heating unit and a controlling switch, is provided with a timer 11 located at the front. The base 1 is provided with a recessed shoulder 12 on top thereof, such as shown in FIG. 3.

Each of the plurality of pot units 2 is configured in conformance to the shape of the base 1 and has a hollowed configuration. A bottom of each pot unit 2 is provided with a grooved shoulder 21, as shown in FIG. 3, and one or more than one steam ducts 22 are located on longitudinal sides of the pot unit 2. In the current embodiment, three steam ducts 22 are arranged. In those three steam ducts 22 of each pot unit 2, one of the steam ducts 22 is defined with an opening 221 on which a cover 222 is associated. According to the preferred embodiment of the present invention, the location of each opening 221 of the steam ducts 22 in each pot unit 2 is different from the other to ensure the steam from the base 1 can be properly directed into the pot unit 2 individually. Accordingly, it is preferred to have the openings 221 of the steam ducts 22 on the left and right sides of each pot unit 2 been offset from each other. As a result, the steam from the base 1 can be introduced diagonally to evenly heat the food placed in the pot unit 2. In addition, each pot unit 2 is provided with tabs 23 on opposite sides thereof for readily seating onto the other pot unit 2 and for convenient handling by the user. As mentioned above, each pot unit 2 is defined with the grooved shoulder 21 in which the condensed water from the steam can be properly collected therein.

The plurality of racks 3 is placed within the pot unit 2 to properly place the food thereon, and which design is in conformance to the internal peripheral of the pot unit 2. Each rack 3 is formed with a section of ring 31 facing downward. In this embodiment, the ring 31 extends the full peripheral, and a plurality of ribs 32 extends across its surface, such as shown in FIG. 3. A handle 33 is formed on the rack 3 for readily handling of the rack 3.

The lid 5 is configured to meet the configuration of the pot unit 2 to readily and tightly cover the upper pot unit 2. A release valve 51 is defined on top of the lid 5. The lid 5 is also provided with a handle 52.

Figure 2:
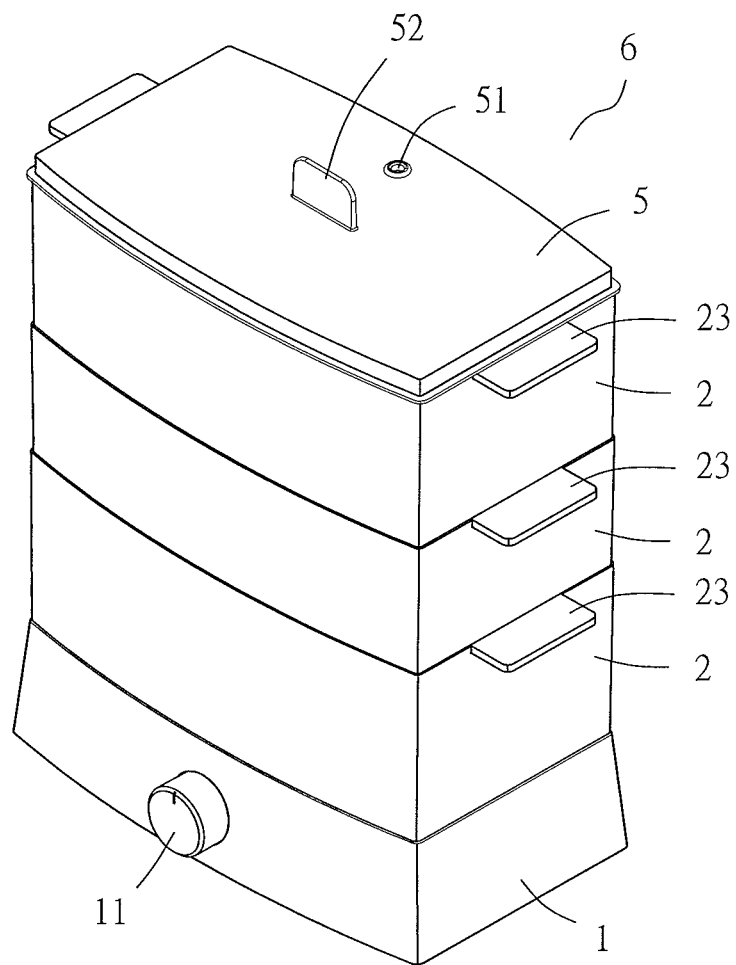
FIG. 2 is an assembled view of the steamer shown in FIG. 1.
Figure 4:
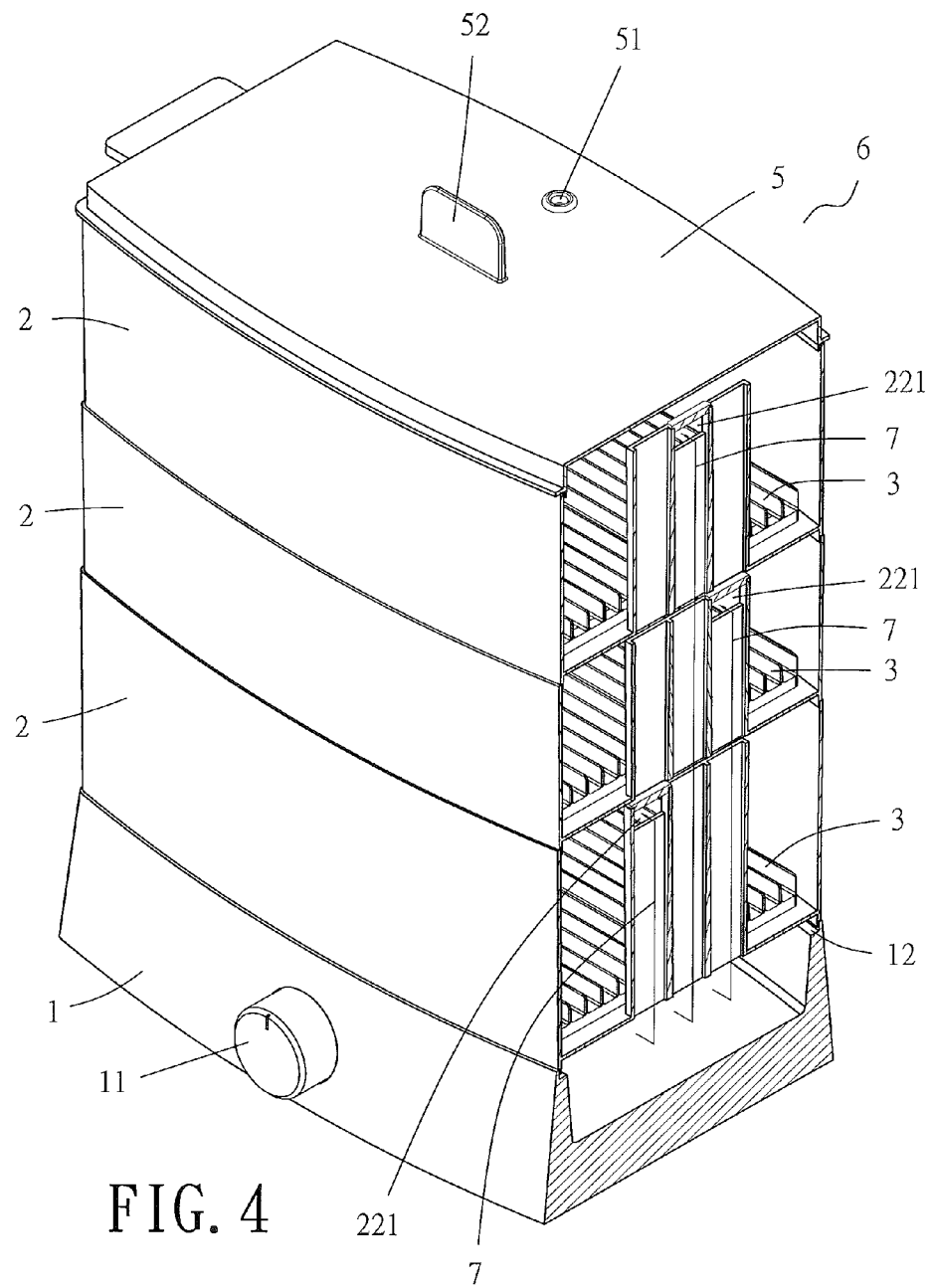
FIG. 4 is a cross sectional view taken along a transversal direction thereof.

The assembly and combination of the base 1, the plurality of pot units 2, the plurality of racks 3, and the lid 5, such as shown in FIGS. 3 and 4, can be facilitated in the following manner. Firstly, the rack 3 is placed onto the pot unit 2 with the ring 31 received into the grooved shoulder 21 of the pot unit 2 such that the rack 3 spans across the grooved shoulder 21 of the pot unit 2. Secondly, the pot unit 2 along with the rack 3 is placed onto the recessed shoulder 12 of the base 1. Thirdly, additional or second and third pot units 2 are placed and seated onto the first pot unit 2 sequentially. Fourthly and finally, the lid 5 is placed onto the upper pot unit 2, and the steamer 6 is completely assembled, such as shown in FIG. 2.

Once the steamer 6 is filled with food to be heated, such as shown in FIG. 4, the heating unit within the base 1 can be turned on, and the steam 7 can be introduced individually into each of the pot units 2 from the openings 221 of the steam ducts 22 to evenly heat the food placed in each pot unit 2. Since the pot units 2 are isolated from each other, and since the steam 7 introduced therein is also individual without mixing, odors of food from the pot units 2 will not interfere with the food located at other pot units 2.

Figure 5:
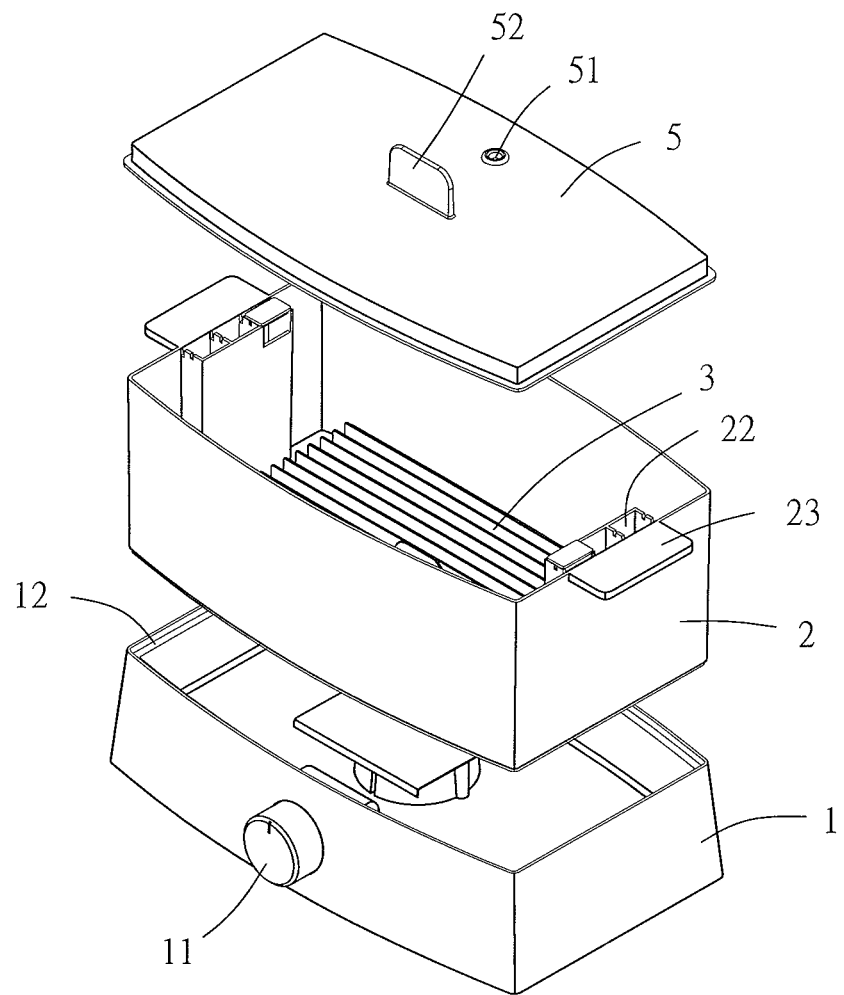
FIG. 5 is an illustration and exploded view in which only one pot unit is used.
Figure 6:
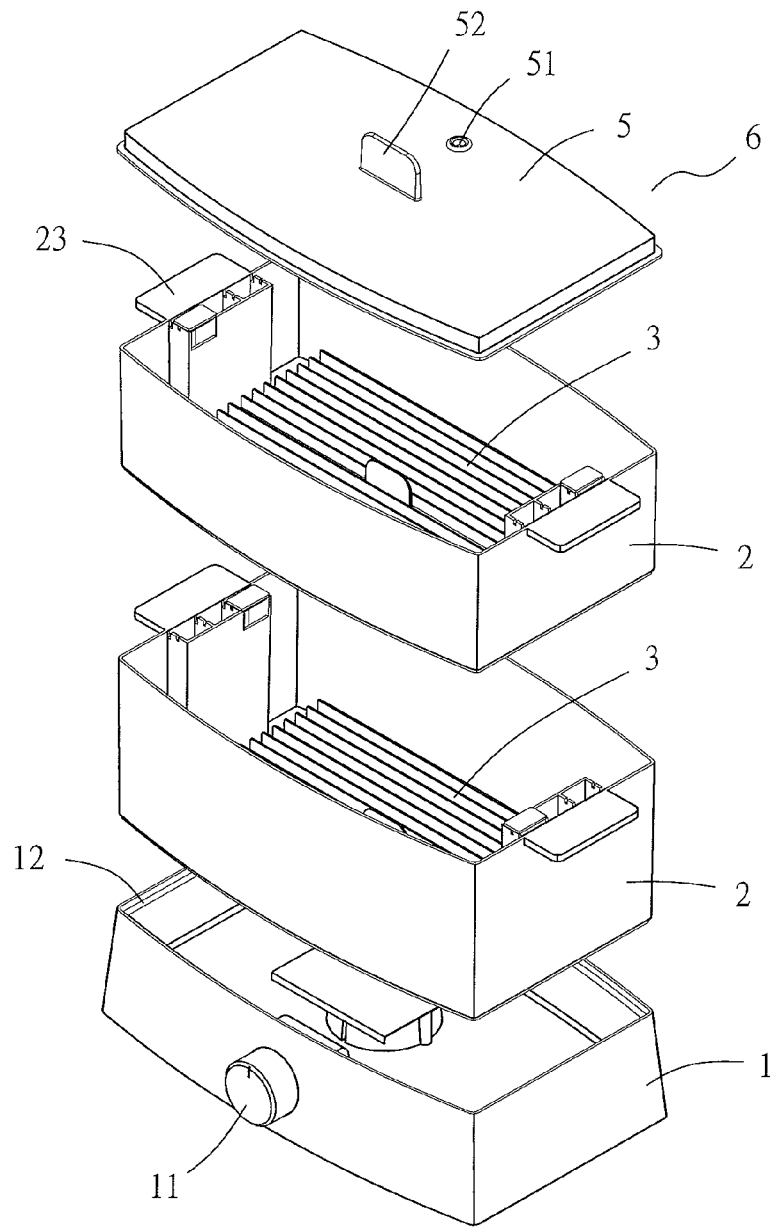
FIG. 6 is an illustration and exploded view in which two pot units are used.
Figure 7:
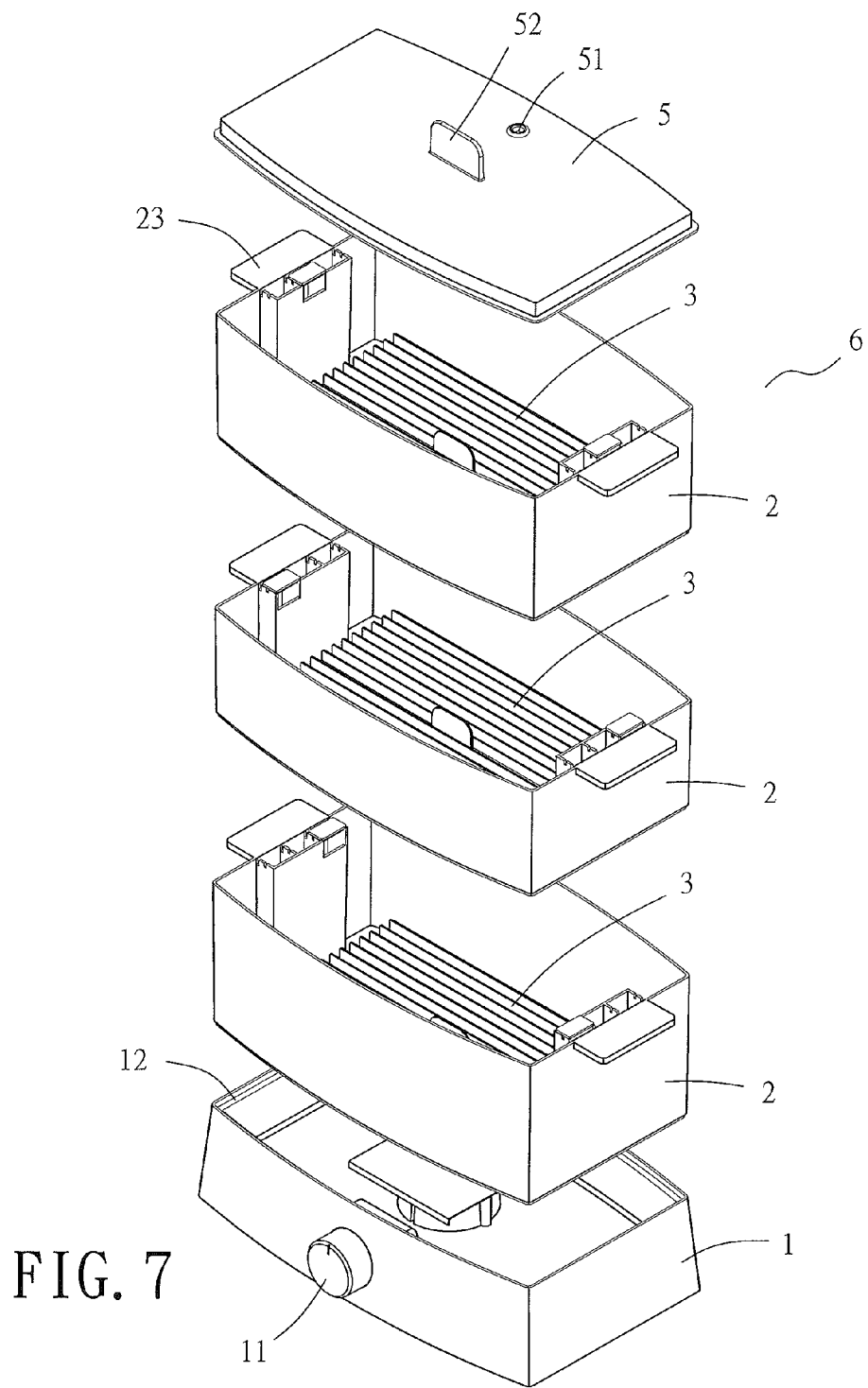
FIG. 7 is an illustration and exploded view in which three pot units are used.

The steamer 6 can be used to have only one pot unit 2, such as shown in FIG. 5. Alternatively, it can be used with two pot units 2, i.e. upper and lower pot units 2, such as shown in FIG. 6. In another way, the steamer 6 can be used with a plurality of pot units 2, such as shown in FIG. 7. It should be noted that the openings 221 of the steam ducts 22 located on both sides of the pot unit 2 are independent with each other. Accordingly, there is no need to designate an order of placing the pot units 2 upon the base 1. The level in which the pot unit 2 is located, i.e. lowest level or highest level, will not have any affect to the communication and functioning of the steam ducts 22 located on both sides.

Figure 8:
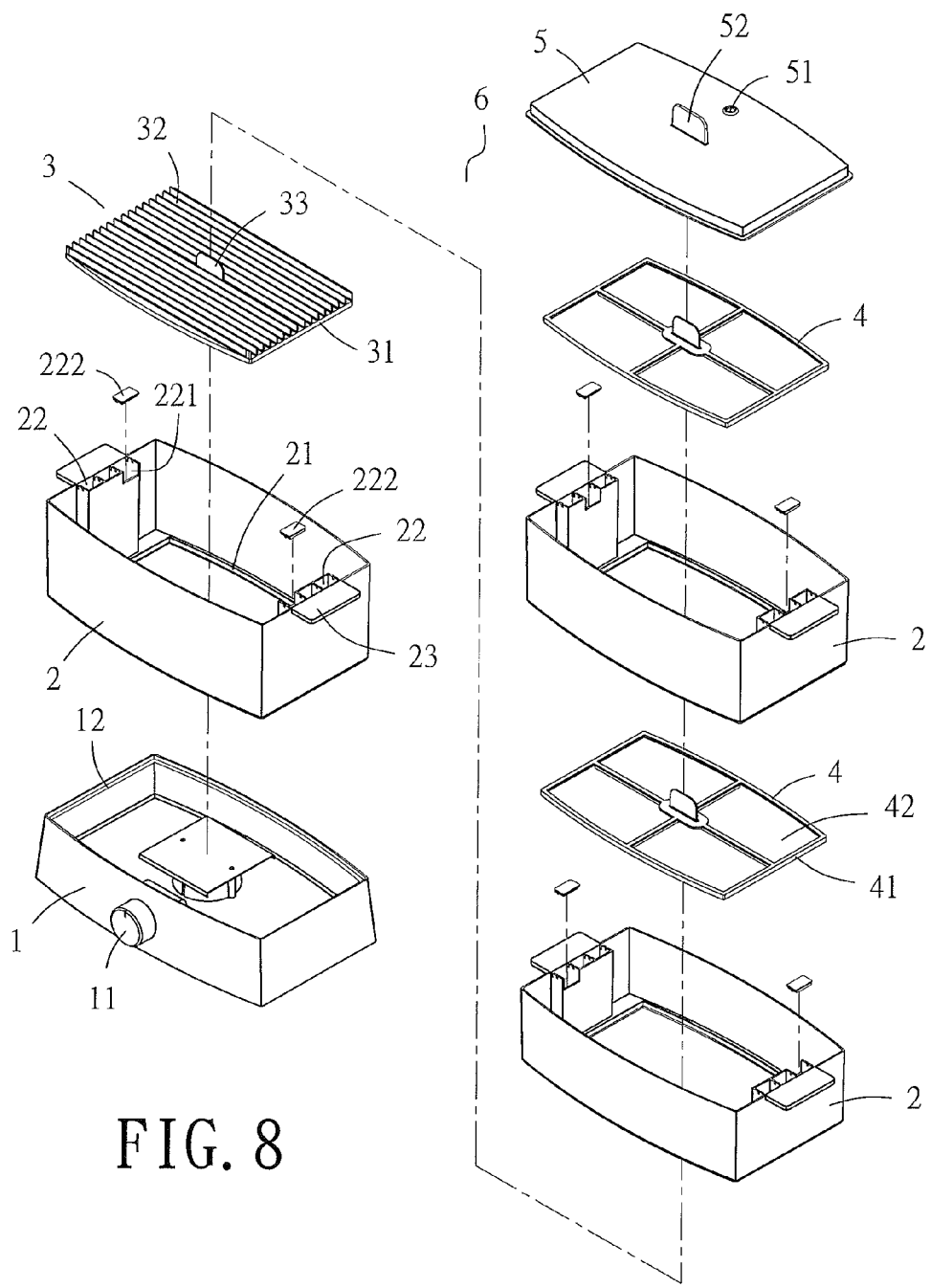
FIG. 8 is an exploded view of a steamer made in accordance with a second embodiment of the present invention.
Figure 9:
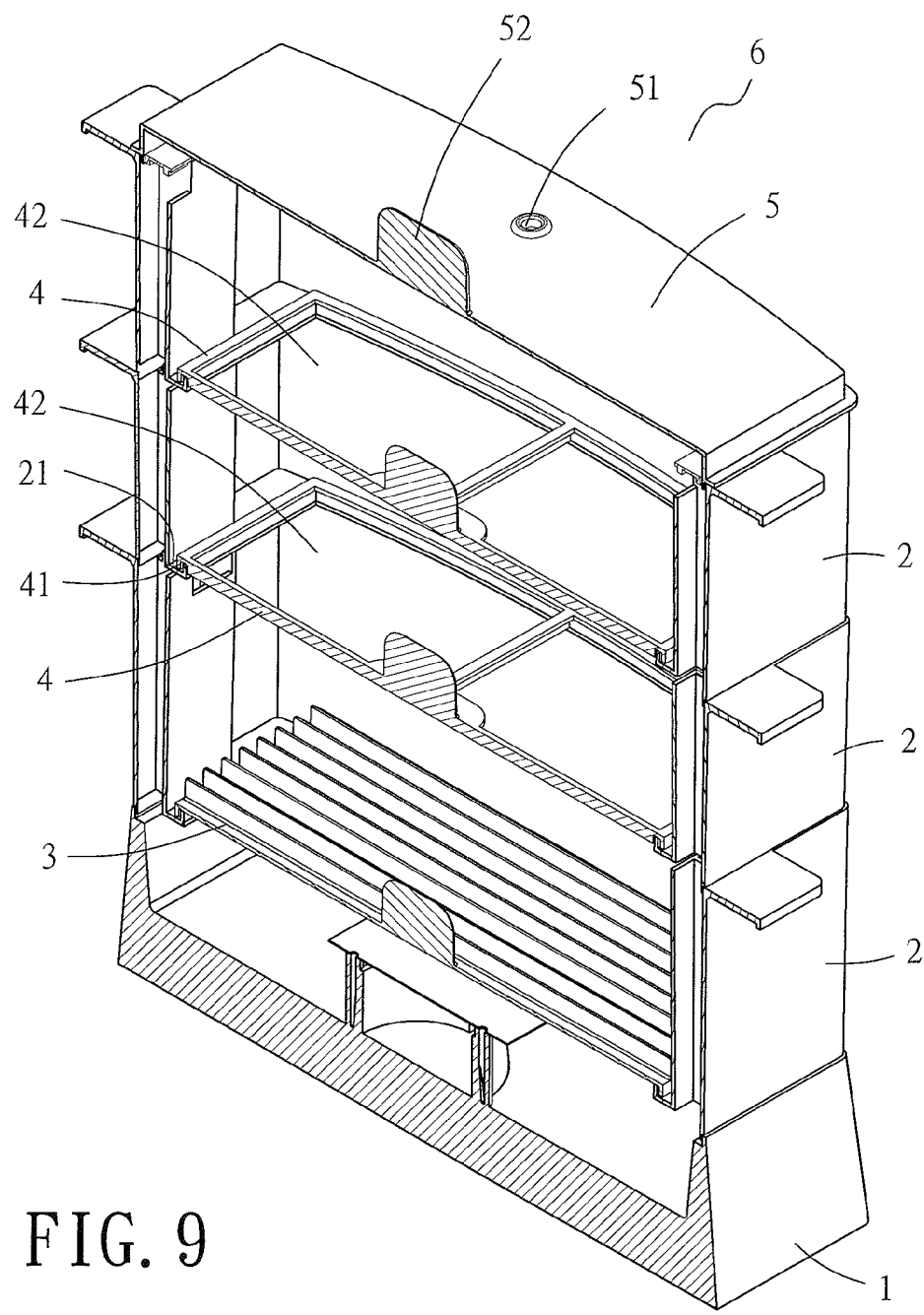
FIG. 9 is a cross sectional view of the steamer of FIG. 8 taken along a longitudinal direction thereof.

When the food is too long to be placed into the pot unit 2 of the steamer 6, such as corn, the rack 3 which is placed within the pot unit 2 can be readily removed, and replaced with a hollowed rack 4, such as shown in FIGS. 8 and 9. The installation of the hollowed rack 4 is similar to the rack 3, and the ring 41 of the hollowed rack 4 is placed onto the grooved shoulder 21 of the pot unit 2. In this situation, the lower rack 3 is still kept in place, while racks 3 located on the second and third (counting from bottom) are removed and replaced with the hollowed racks 4. In light of this, the pot units 2 jointly create a vertical space 42 to accommodate the elongate food, such that the corns sit vertically on the rack 3 of the lowest pot unit 2 and then extend through the second and third pot units 2. Again, the steam 7 can be introduced individually into each of the pot units 2 of the steamer 6 to heat the food placed therein.

Figure 10:
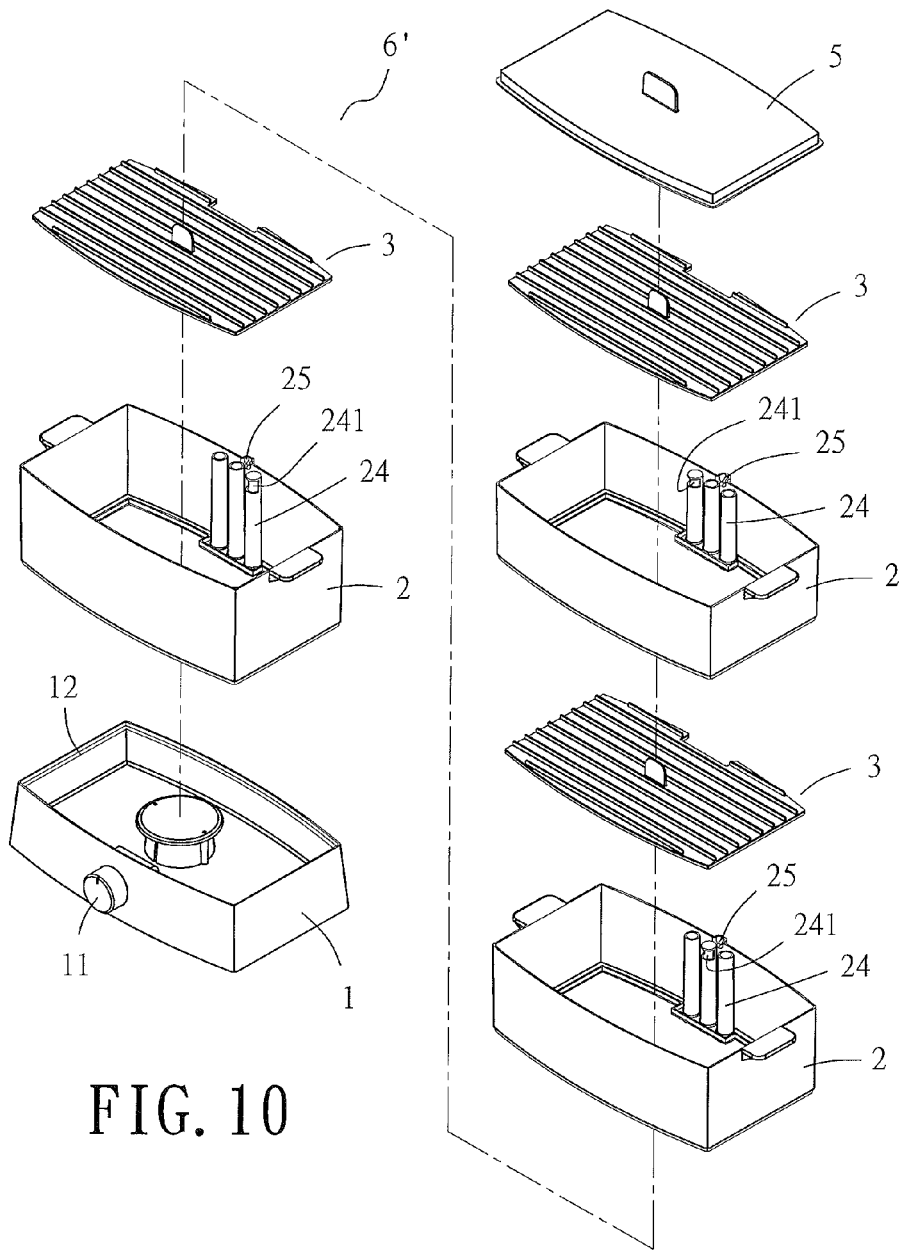
FIG. 10 is an exploded view of a steamer made in accordance with a third embodiment of the present invention.
Figure 13:
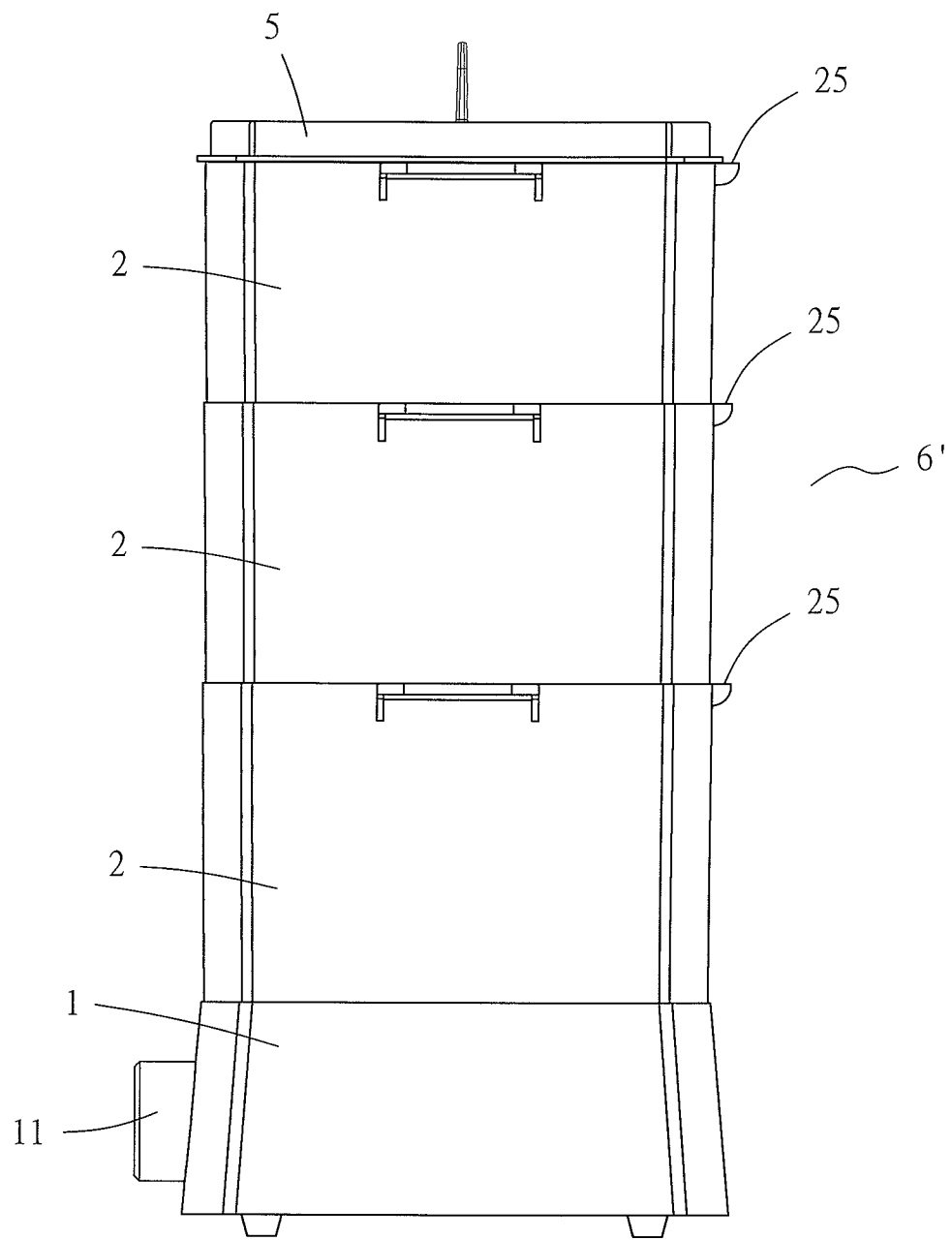
FIG. 13 is a cross sectional view of the steamer of the third embodiment of the present invention taken along a traversal direction thereof.

FIG. 10 illustrates another embodiment of the steamer 6' made in accordance with the present invention, and it is configured with a base 1 built-in with a heating unit and a controlling switch, a plurality of pot units 2, a plurality of rack 3, and a lid 5. The steamer 6' is quite similar to the steamer 6 discussed in FIG. 1, and the difference is that each of the pot units 2 is incorporated with one or more than one steam ducts 24 on one of the longitudinal sides, i.e. a rear side viewed from the drawing. Each of the steam ducts 24 is defined with an opening 241, and each opening 241 on each pot unit 2 is different from one another. Accordingly, the steam from the base 1 can be readily introduced into the individual pot units 2 through the openings 241, respectively. On the other hand, a release valve 25 is defined on each pot unit 2 located in the side in which the steam ducts 24 are located, such as shown in FIGS. 10 and 13.

Figure 11:
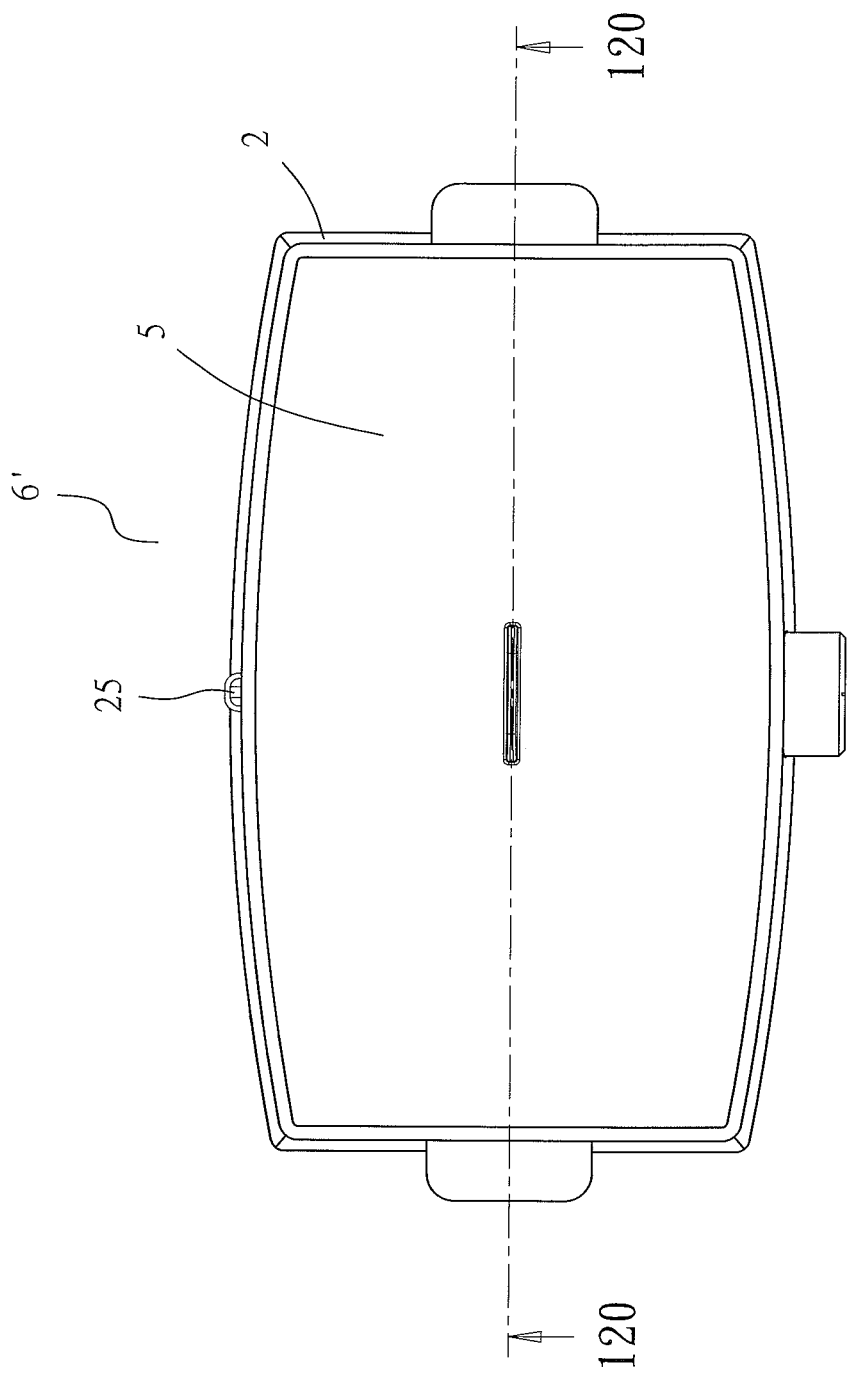
FIG. 11 is a top view of the steamer made in accordance with the third embodiment of the present invention.
Figure 12:
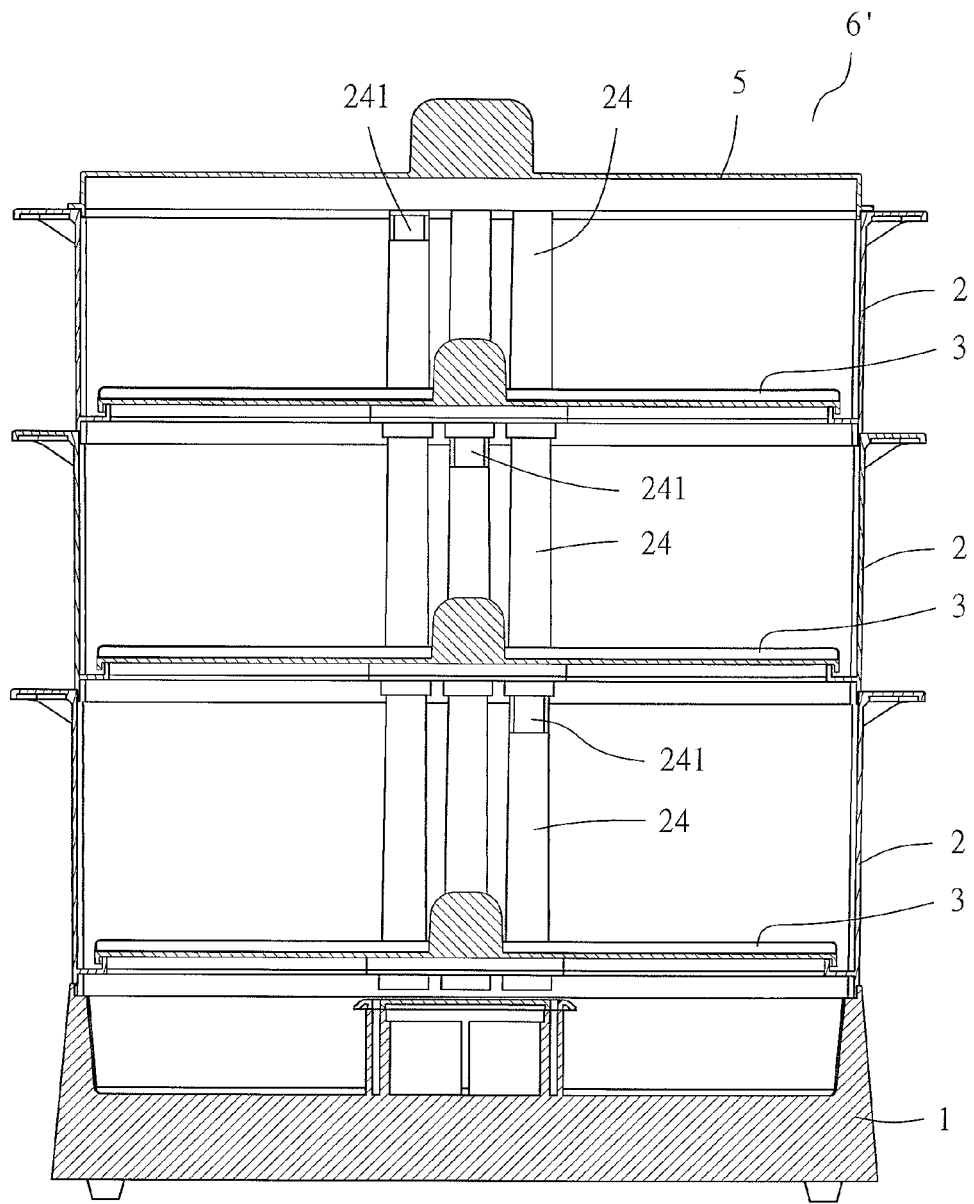
FIG. 12 is a cross sectional view of the steamer of the third embodiment of the present invention taken along a longitudinal direction thereof.

The assembling of the base 1, the plurality of pot units 2, the plurality of racks 3, and the lid 5 is illustrated respectively in FIGS. 11 and 12. Firstly, the pot unit 2 is placed onto the base 1, and the rack 3 is placed onto the bottom of the pot unit 2. Since each of the pot units 2 is incorporated with at least one steam duct 24 having the opening 241 thereof, the steam coming from the base 1 can be readily introduced into the pot unit 2. The upper pot unit 2 can be covered with the lid 5. Then, the food is ready to be heated in the steamer 6'. Accordingly, with the steam generated from the heating unit of the base 1 readily introduced into each individual pot unit 2, the food placed therein can be evenly heated to the intended temperature, such as shown in FIGS. 12 and 13. It can be readily appreciated that since the pot unit 2 is heated individually by the steam 7 which is introduced in through the opening 241 of the steam duct 24 located at rear side, odors from foods from different pot units 2 will not mix.

There are a variety of ways to use the steamer 6', such as illustrated by the steamer 6 of FIG. 1. For example, the base 1 can be used with one pot unit 2, with two pot units, or, alternatively, with three or more pot units 2. It should be noted that the openings 241 of the steam ducts 24 located on the longitudinal side of the pot unit 2 are independent with each other. Accordingly, there is no need to designate an order of placing the pot units 2 upon the base 1. The level in which the pot unit 2 is located, i.e. lowest level or highest level, will not have any affect to the communication and functioning of the steam ducts 24 located on both sides.

Again, when steaming with the elongate food with the steamer 6, such as corns, the racks 3 on the upper levels can be replaced with the hollowed racks 4, such as shown in FIGS. 8 and 9, while the rack 3 of the pot unit 2 in the lowest level can be kept in tact. Accordingly, the elongate food can be placed on the lowest level, and then extends into the second and third levels, i.e. into the vertical space 42 defined by the hollowed racks 4. The steam can be readily introduced into each of the pot units 2 to heat the food to an intended temperature.

What is claimed is:

1. A steamer for heating food with steam, comprising a base built-up with a heating unit and a controlling switch, a plurality of pot units, a plurality of racks, and a lid;
wherein each pot unit is readily seated on top of the base, wherein the plurality of racks is readily placed on bottoms of the plurality of pot units, wherein a steam duct is arranged on longitudinal ends of each pot unit, wherein at least one opening is defined in each steam duct, with a cover associated with each opening, wherein the steam from the base is readily introduced into each pot unit through the openings, wherein the lid is placed onto an upper pot unit, wherein the bottom of each pot unit is provided with a grooved shoulder in which a ring of one of the plurality of racks is disposed therein, wherein the grooved shoulder collects condensed water from the steam, wherein once the steamer is filled with food to be heated, the heating unit within the base is turned on, and the steam introduced individually into each of the plurality of pot units from the opening of the steam ducts to evenly heat the food placed in each pot unit, wherein the pot units is isolated from each other, wherein the steam introduced in each pot unit is also individual without mixing, and wherein odors of food from each pot unit will not interfere with the food located at other pot units.

2. The steamer as recited in claim 1, wherein the base is provided with a recessed shoulder on a top thereof for firmly receiving one of the plurality of pot units thereon.

3. The steamer as recited in claim 1, wherein the lid covered on the upper pot unit is provided with a release valve.

4. The steamer as recited in claim 1, wherein each pot unit is provided with tabs on opposite sides thereof for readily seating onto another pot unit and for convenient handling by the user.

5. A steamer for heating food with steam, comprising a base built-up with a heating unit and a controlling switch, a plurality of pot units, a plurality of racks, and a lid;
wherein each pot unit is readily seated on top of the base, wherein the plurality of racks is readily placed on bottoms of the plurality of pot units, wherein a steam duct is arranged on longitudinal ends of each pot unit, wherein at least one opening is defined in each steam duct, with a cover associated with each opening, wherein the steam from the base is readily introduced into each pot unit through the openings, wherein the lid is placed onto an upper pot unit, wherein each rack includes a plurality of ribs across a surface thereof, and wherein a handle is formed on a top of each rack, wherein once the steamer is filled with food to be heated, the heating unit within the base is turned on, and the steam introduced individually into each of the plurality of pot units from the opening of the steam ducts to evenly heat the food placed in each pot unit, wherein the pot units is isolated from each other, wherein the steam introduced in each pot unit is also individual without mixing, and wherein odors of food from each pot unit will not interfere with the food located at other pot units.

6. The steamer as recited in claim 5, wherein each pot unit is provided with tabs on opposite sides thereof for readily seating onto another pot unit and for convenient handling by the user.

7. The steamer as recited in claim 5, wherein the lid covered on the upper pot unit is provided with a release valve.

8. The steamer as recited in claim 5, wherein the base is provided with a recessed shoulder on a top thereof for firmly receiving one of the plurality of pot units thereon.

9. A steamer for heating food with steam, comprising a base built-up with a heating unit and a controlling switch, a plurality of pot units, a plurality of racks, and a lid;
wherein each pot unit is readily seated on top of the base, wherein the plurality of racks is readily placed on bottoms of the plurality of pot units, wherein a steam duct is arranged on longitudinal ends of each pot unit, wherein at least one opening is defined in each steam duct, with a cover associated with each opening, wherein the steam from the base is readily introduced into each pot unit through the openings, wherein the lid is placed onto an upper pot unit, wherein the at least one opening comprises openings on opposite sides of each pot unit offset from each other, wherein the steam from the base is introduced diagonally to evenly heat the food placed in each pot unit, wherein once the steamer is filled with food to be heated, the heating unit within the base is turned on, and the steam introduced individually into each of the plurality of pot units from the opening of the steam ducts to evenly heat the food placed in each pot unit, wherein the pot units is isolated from each other, wherein the steam introduced in each pot unit is also individual without mixing, and wherein odors of food from each pot unit will not interfere with the food located at other pot units.

10. The steamer as recited in claim 9, wherein the base is provided with a recessed shoulder on a top thereof for firmly receiving one of the plurality of pot units thereon.

11. The steamer as recited in claim 9, wherein each pot unit is provided with tabs on opposite sides thereof for readily seating onto another pot unit and for convenient handling by the user.

12. The steamer as recited in claim 9, wherein the lid covered on the upper pot unit is provided with a release valve.

13. A steamer for heating food with steam, comprising a base built-up with a heating unit and a controlling switch, a plurality of pot units, a plurality of racks, and a lid;
  wherein each pot unit is readily seated on top of the base, wherein the plurality of racks is readily placed on bottoms of the plurality of pot units, wherein a steam duct is arranged on longitudinal ends of each pot unit, wherein at least one opening is defined in each steam duct, with a cover associated with each opening, wherein the steam from the base is readily introduced into each pot unit through the openings, wherein the lid is placed onto an upper pot unit,
  wherein the plurality of pot units comprises a lower pot unit seated on the top of the base and an upper pot unit seated on the lower pot unit, wherein the plurality of racks placed within the plurality of pot units are readily removed, wherein an associated rack of the plurality of racks placed within the upper pot unit is a hollowed rack, wherein a ring of the hollowed rack is readily disposed within a grooved shoulder to accommodate elongated food, wherein once the steamer is filled with food to be heated, the heating unit within the base is turned on, and the steam introduced individually into each of the plurality of pot units from the opening of the steam ducts to evenly heat the food placed in each pot unit, wherein the pot units is isolated from each other, wherein the steam introduced in each pot unit is also individual without mixing, and wherein odors of food from each pot unit will not interfere with the food located at other pot units.

14. The steamer as recited in claim 13, wherein the base is provided with a recessed shoulder on a top thereof for firmly receiving one of the plurality of pot units thereon.

15. The steamer as recited in claim 13, wherein each pot unit is provided with tabs on opposite sides thereof for readily seating onto another pot unit and for convenient handling by the user.

16. The steamer as recited in claim 13, wherein the lid covered on the upper pot unit is provided with a release valve.

* * * * *